April 15, 1969  E. J. STENGLE, JR  3,438,116
METHOD OF ASSEMBLING A COMPOSITE CONTAINER
Filed Dec. 1, 1966  Sheet 1 of 4

INVENTOR.
EDWARD J. STENGLE JR
BY W.A. Schaich &
Thomas A. Meehan
ATTORNEYS

April 15, 1969 E. J. STENGLE, JR 3,438,116
METHOD OF ASSEMBLING A COMPOSITE CONTAINER Filed Dec. 1, 1966 Sheet 2 of 4

INVENTOR.
EDWARD J. STENGLE JR
BY W. A. Schaich &
Thomas A. Meehan
ATTORNEYS

April 15, 1969  E. J. STENGLE, JR  3,438,116

METHOD OF ASSEMBLING A COMPOSITE CONTAINER

Filed Dec. 1, 1966  Sheet 3 of 4

INVENTOR.
EDWARD J. STENGLE
BY W. A. Schaich &
Thomas A. Meehan
ATTORNEYS

April 15, 1969 E. J. STENGLE, JR 3,438,116
METHOD OF ASSEMBLING A COMPOSITE CONTAINER
Filed Dec. 1, 1966 Sheet 4 of 4
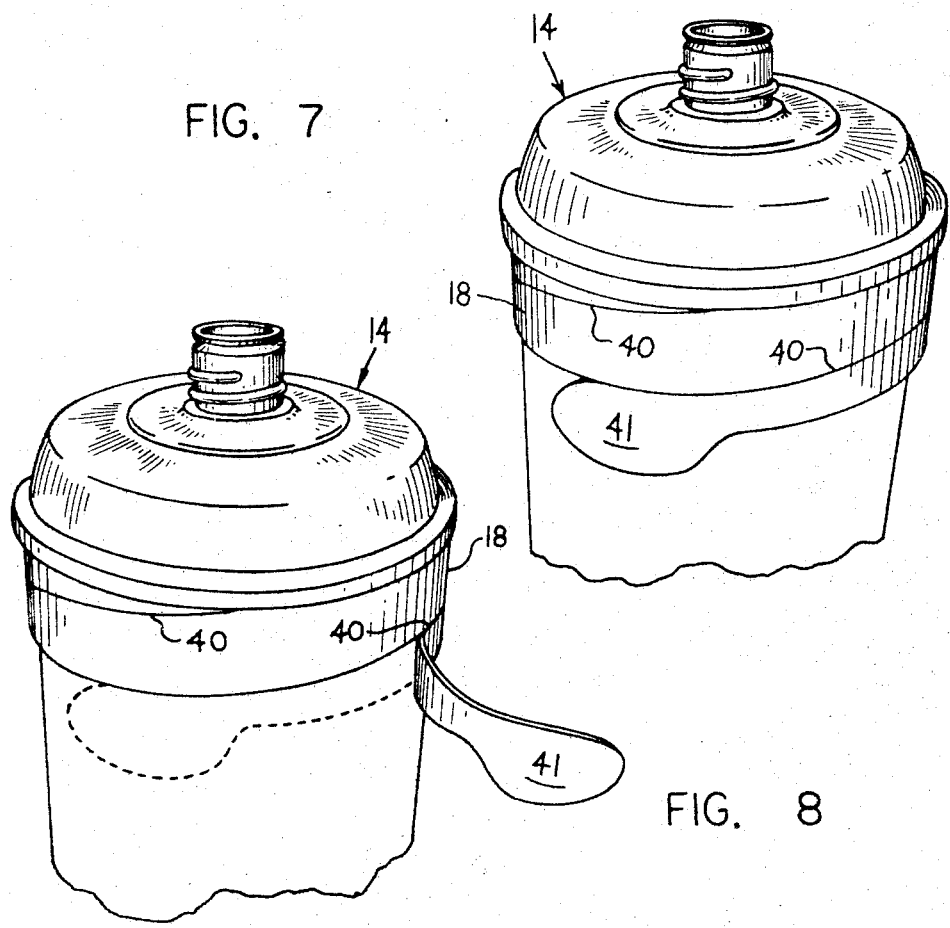
FIG. 7
FIG. 8
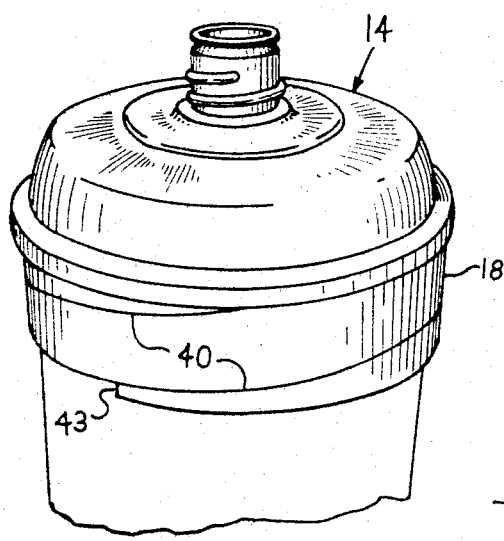
FIG. 9
INVENTOR.
EDWARD J. STENGLE JR.
BY W. A. Schaich &
Thomas A. Meehan
ATTORNEYS United States Patent Office 3,438,116
Patented Apr. 15, 1969

3,438,116
METHOD OF ASSEMBLING A COMPOSITE CONTAINER
Edward J. Stengle, Jr., Toledo, Ohio, assignor to Owens-Illinois, Inc., a corporation of Ohio
Continuation-in-part of application Ser. No. 231,327, Oct. 15, 1962, which, in turn, is a continuation-in-part of application Ser. No. 199,804, June 4, 1962. This application Dec. 1, 1966, Ser. No. 598,446
Int. Cl. B65b 7/28; B65d 23/00, 53/00
U.S. Cl. 29—447                                    4 Claims

ABSTRACT OF THE DISCLOSURE

The method of assembling a composite container from a glass tumbler and a fitment of thermoplastic material in which the fitment is heated to cause it to expand and is then, while still hot, placed over the open end of the tumbler and allowed to cool to thereby contract and securely grip the tumbler.

---

This application is a continuation-in-part of copending application Ser. No. 231,327, filed Oct. 15, 1962, now abandoned, and entitled, Container, which, in turn, is a continuation-in-part of copending application Ser. No. 199,804, filed June 4, 1962, now abandoned, and entitled, Container.

This invention relates generally to a method of assembling a composite container, especially a container comprising the combination of a fitment and a glass tumbler.

In the marketing of goods such as liquid detergents, liquid hand creams, bath powder, food, or the like, it has long been customary to supply these goods to the consumer in a glass, plastic, or metal container which is discarded when the contents are gone. This practice limits the use of such a container to but one purpose, to wit: storing the material contained therein from the place of packaging to the place of ultimate use.

It is an object of this invention to provide a method of assembling a composite container of such a construction that at least a part of the container may be of additional and continued use to the ultimate consumer after it has served the purpose of mere storage.

In the marketing of goods the use of "premium" items to provide additional incentive for the consumer to purchase the primary goods has been extremely successful. With this in view, it is a further object of this invention to provide a method of assembling a container wherein the "premium" item forms a part of the container itself.

More specifically, it is an object of this invention to provide a method of assembling a composite container which is the combination of a fitment secured to a tumbler, which combination may be used first to contain a product placed therein and which, when such product is gone, may have the fitment easily removed from the glass tumbler.

An additional object is to provide a method for assembling a fitment and a tumbler to form a composite container.

Other objects and advantages will become apparent from the following detailed description taken in conjunction with the enclosed drawings illustrating several modifications and in which:

FIGURES 7 and 8 are fragmentary perspective views of a modified fitment, provided with a spiral groove to permit easy removal; and FIGURE 9 is a fragmentary perspective view of a further modified fitment.

In brief, the container assembled by this invention comprises a wide-mouth container having a fitment secured to the open top thereof by means of shrinking such fitment around said open top. The invention will be described in combination with a plastic fitment; however, it should be understood that other wide-mouth containers may be used in place of the tumbler. Although it is not essential to the invention, the fitment may have an opening therein through which the contents of the composite container may be removed. Where present, such opening may be closed in any conventional manner, as by a threaded closure cap.

Figure 1:
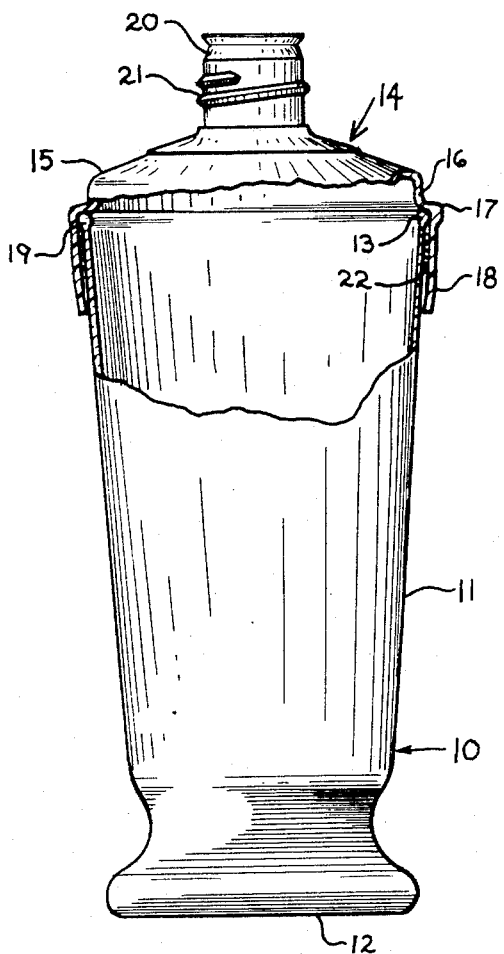
FIGURE 1 is an elevational view partly in section of the preferred composite container assembled by the method of the present invention.
Figure 6:
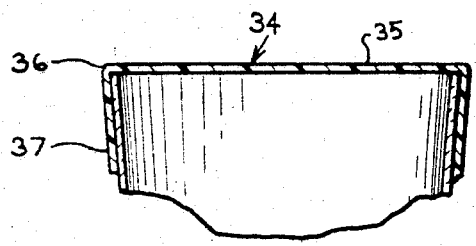
FIGURES 5 and 6 are fragmentary elevational sectional views showing modified fitment designs.

Referring to FIGURE 1, there is shown a fitment generally designated 14 mounted on a tumbler generally designated 10 to form a composite container. The tumbler 10 has a main body portion 11 and a lower end portion 12 forming a closed bottom. The body portion 11 terminates at its upper end in an annular rim. The rim in FIGURE 1 is shown as a bead 13. This bead is normally present on most glass tumblers by reason of the process involved in producing the tumblers. However, the composite container of the present invention contemplates a fitment and a tumbler combination which is not limited to a particular tumbler. Obviously the fitment may be applied to a tumbler that does not have a bead, for example as shown in FIGURE 6. Although the body portion 11 of the tumbler 10 is shown as having a frustoconical shape flaring outwardly as it approaches the top, such shape is not essential—the only requirement being that the shape of the top is such that the fitment will securely engage it upon shrinkage. Further it is not essential for this invention that the tumbler be circular in cross section; however, most commercially produced tumblers are circular in cross section.

The fitment 14 comprises an upwardly sloping top portion 15 which blends into a downwardly turned shoulder portion 16. The shoulder portion 16 terminates at its lower portion in an outwardly flaring annular shoulder 17 having a lower skirt 18 depending therefrom.

An internally formed, annular groove 19 is positioned at the juncture of the shoulder 17 and the lower skirt 18. The groove 19 is adapted to snugly receive therein the annular bead 13 of the tumbler 10. The bead 13 and the grove 19 thus serve the function of a vertical lock to assist in preventing the fitment 14 from being dislodged from the tumbler 10. The fitment 14 is provided with a neck 20 through which the contents of the composite container may be poured. Although the neck 20 of the fitment 14 in FIGURE 1 is shown as having a threaded portion 21 adapted to receive a conventional screw cap, it should be understood that any means, compatible with the product that is being packaged, may be used to close the fitment.

Figure 2:
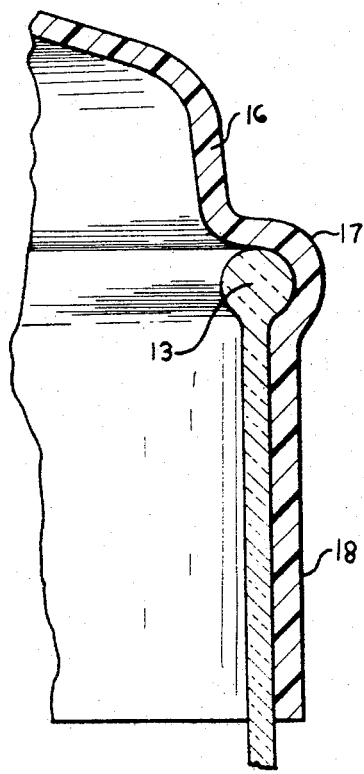
FIGURE 2 is an enlarged, fragmentary, sectional view showing one type of seal between the fitment and the tumbler.

By providing a fitment made from a material possessing the property of expanding upon heating and shrinking upon cooling, the fitment may be heated to cause it to expand sufficiently to permit its being placed over the top of the tumbler. Upon cooling the fitment will shrink and thereby sealingly engage the top of the tumbler 10 as shown in FIGURES 1 and 2. Such a shrink fit engagement provides an adequate seal between the fitment 14 and the tumbler 10 to provide a composite container.

The sealing principle is based on the thermal expansion of a plastic fitment which adapts to the outside diameter of a glass tumbler. The coefficient of thermal expansion (percent expansion/degree temperature change/ inch/inch) can be expressed in terms of linear or cubical and the value is representative of a change in unit dimension which is caused by a temperature rise. The dimensional change of the fitment described herein is utilized to adapt it to a larger diameter to which it seals upon cooling to its original diameter at room temperature.

The degree of thermal expansion is also dependent on the plastic material used and the temperature to which it is exposed. Polyolefin resins considered for this application, such as high-density polyethylene and polypropylene, exhibit similar thermal expansion coefficients; however, polypropylene has a much higher melt temperature (160° C. for polypropylene to 125° C. for high-density polyethylene) and can thus provide increased expansion, and adapt to larger diameters for a tighter seal upon cooling to room temperature.

In conclusion, therefore, the dimensional change of a fitment utilized in accordance with the above-described process would be dependent on the following:

(1) The thermal expansion coefficient of the polymer used, (2) The melt temperature or heat distortion temperature of the molded article as it effects the expansion available (temperature to which it can be heated), and (3) The dimensions of the molding—the larger the molding the more expansion available.

From the foregoing factors, polypropylene, among presently available thermoplastic materials, is believed to have overall superiority, from the standpoint of performance and cost, as a fitment to be applied by the method of the present invention to articles in the size range of a glass tumbler.

Figure 3:
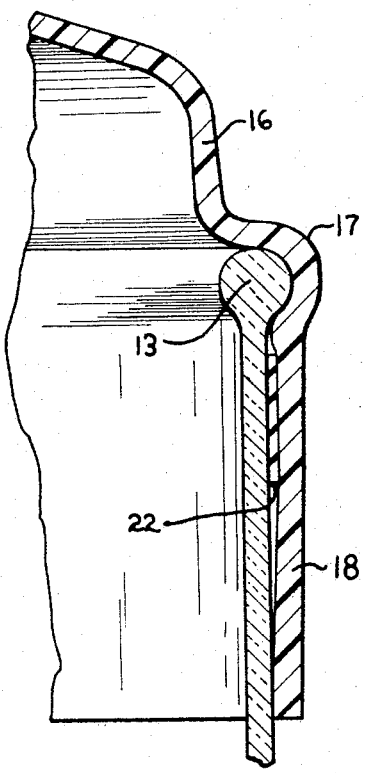
FIGURE 3 is a view similar to FIGURE 2 showing the sealing arrangement provided between the fitment and the tumbler of the preferred embodiment of FIGURE 1.

In some instances, as where liquid detergents are packaged in the container, the nature of the goods is such that a certain amount of vapor pressure builds up when the filled container is stored at elevated temperatures. In those instances, it is desirable to use the embodiment shown in FIGURES 1 and 3 wherein a gasket 22 is placed between the fitment 14 and the tumbler 10.

The position of the gasket 22 depends in part upon what type of material is being used for such gasket. Thus, if a band of rubber is used for the gasket, it should be positioned on the tumbler sufficiently below the annular bead 13 to preclude its interfering with the locking engagement between said bead and the groove 19 of the fitment. On the other hand if a band of plastisol material, such as polyvinyl chloride, is used, it may be placed either on the outside of the tumbler or the inside of the fitment. If placed on the tumbler, the plastisol may be positioned on the bead or on the wall of the tumbler. If placed on the fitment, it may be positioned in the groove 19 or on the inside of the skirt.

When a rubber band is used for the gasket 22, it has been found necessary for packaging some products, particularly liquids having extremely low surface tension, that such rubber band be of seamless construction to provide an absolute, leak proof, seal. Furthermore, a natural gum rubber has been found particularly well suited for such application.

After the housewife uses the contents supplied in the composite container, she may remove the fitment 14 and have as a premium the tumbler 10. If the fitment has been formed from a material having a higher coefficient of expansion than the glass tumbler, the fitment 14 may be removed merely by heating the composite container to cause the fitment to expand sufficiently to be easily removed from the tumbler. Generally, immersing the container in hot water, for example when washing, will expand the fitment enough to permit removal.

Figure 4:
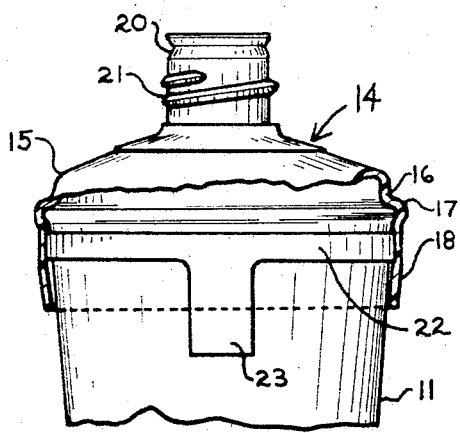
FIGURE 4 is a fragmentary, elevational view; partly in section showing a modification of the sealing gasket of FIGURE 1 having a pull tab thereon.

As an aid in removing the fitment when a band of rubber is used as the gasket, there is shown in FIGURE 4, a modification wherein such rubber gasket 22 is provided with a pull tab 23 which extends below the bottom of the skirt 18 an amount sufficient to permit the user to grasp it. In this modification the housewife merely soaks the composite container in hot sudsy water. The heat expands the fitment and the sudsy water provides sufficient lubricity to permit the rubber gasket 22 to be pulled from between the inside of the skirt 18 and the wall of the tumbler 10 when the housewife pulls on the tab 23. The fitment may then be easily lifted from the top of the tumbler.

Figure 5:
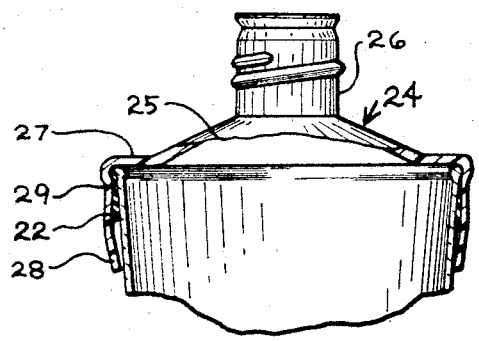

FIGURE 5 illustrates a modified fitment 24 having a slightly different configuration from that shown in FIGURES 1–4. The fitment shown in FIGURE 5 comprises a generally upwardly sloping body portion 25 having a threaded neck portion 26 in the center and an outwardly flaring, annular shoulder 27 at its periphery. An annular skirt 28 depends from the shoulder 27 as in the previous example. There is also provided an internally disposed annular groove 29 to insure locking engagement with the bead of the tumbler. Although FIGURE 5 is shown with a gasket 22, it should be understood from the previous description that use of such a gasket is optional depending upon the nature of the material being packaged.

There is shown in FIGURE 6 a further modification wherein a fitment 34 capable of sealing but not dispensing is provided. Such fitment comprises a disc-like top portion 35 terminating at its outer periphery in an annular shoulder 36 having an annular skirt 37 depending therefrom. This type fitment may be used where the nature of the material packaged in the composite container is such that the user will ordinarily use the entire contents upon opening. As an alternative, the fitment may have a sifter top design to provide access to the contents. After the container is empty, the fitment may be removed by the methods herein described.

Still another modification is shown in FIGURES 7 and 8 wherein the fitment 14 has a spiral groove 40 located around its skirt 18. Although the groove provides a weakened area around the skirt 18 of the fitment 14, by virtue of its spiral configuration, it does not adversely affect the strength or rigidity of the fitment. The groove 40 may be formed in the skirt by any desired means; however, where an injection molded fitment is used, it would be most economical to mold in the spiral groove during the injection molding process. A tab 41 is located at the lower end of the spiral groove to provide means which may be easily grasped by the consumer. Thus, when the consumer desires to remove the fitment 14 from the tumbler, it is necessary to merely grasp the tab 41 and pull it. Such pulling tears the skirt 18 along the groove 40 (FIG. 8) to permit easy removal of the fitment from the tumbler. The ease with which the fitment of this embodiment is removed may be appreciated when it is observed that the tearing occurs most readily when the tab 41 is pulled at an angle normal to the point of severing and that this is the angle which ordinarily results when the tab is pulled away from the skirt.

If desired, a small notch 43 as shown in FIG. 9 may be provided instead of the pull tab of FIGURES 7 and 8. In that case, the consumer merely inserts a fingernail in the notch to start tearing the skirt along the groove.

Although the weakened area for the embodiments of FIGURES 7 and 9 has been referred to as a groove, it should be understood that other types of weakening, such as perforating or scoring, are fully within contemplation of this embodiment of the invention.

A wide range of materials may be used to construct the fitments described in the foregoing embodiments. The essential characteristic which such material must possess is that it is capable of being shrunk to form a seal with the tumbler. In plastic fitments, polyolefin resins have been found to be very satisfactory.

When the fitment shrinks over the top of the tumbler, it is subjected to considerable stress. Therefore, it is desirable to provide a plastic material which has the property of stress resistance. Polypropylene has been found to be exceptionally well suited for this use because of its superior stress crack resistance. However, high-density polyethylene has also proved very satisfactory for these fitments.

When plastic is used for the fitment, it may be made by any of the well-known plastic fabrication methods such as injection molding or blow molding.

The tumbler, while disclosed as being made of glass, could be made of some other material. The only criteria as to the physical qualities of the tumber is that it have sufficient wall rigidity so that it will not become deformed upon application of the fitment to the extent that a poor seal is made.

It can easily be seen from the foregoing description that this invention provides a novel method of assembling a composite container of simple construction which may be produced competitively with other containers.

It is obvious that numerous modifications will become apparent to those skilled in the art. Accordingly, it is not the intention to limit the scope of the patent granted hereon otherwise than as necessitated by the appended claims.

I claim:

1. The methd of assembling a polypropylene fitment and a tumbler into a composite container comprising the steps of applying heat to said fitment to expand same, placing the fitment while hot over the open end of said tumbler, and maintaining said fitment and tumbler in engagement until said fitment cools and grips the tumbler.

2. The method of assembling a polypropylene fitment and a tumbler into a composite container comprising the steps of placing a rubber gasket around said tumbler spaced below its upper edge, applying heat to said fitment to expand same, placing the fitment while hot over the open end of said tumbler, and maintaining said fitment and tumbler in engagement until said fitment cools and grips the gasket and tumbler.

3. The method of assembling a polypropylene fitment and a tumbler into a composite container comprising the steps of forming a gasket around said tumbler, applying heat to said fitment to expand same, placing the fitment while hot over the open end of said tumbler, and maintaining said fitment and tumbler in engagement until said fitment cools and grips the gasket and tumbler.

4. The method of assembling a polypropylene fitment and a tumbler into a composite container comprising the steps of forming a gasket internally of said fitment in an area where it will encircle said tumbler when said fitment is in engagement with said tumbler, applying heat to said fitment to expand same, placing the fitment while hot over the open end of said tumbler, and maintaining said fitment and tumbler in engagement until said fitment cools and grips the tumbler.

References Cited

UNITED STATES PATENTS

| 508,351 | 11/1893 | Shipe. | |
| 579,969 | 4/1897 | Fellows | 29—447 |
| 1,151,875 | 8/1915 | Haslup | 215—40 |
| 1,932,617 | 10/1933 | Ford et al. | 264—342 X |
| 2,608,334 | 8/1952 | Knocke. | |
| 2,885,105 | 5/1959 | Heyl et al. | |

FOREIGN PATENTS

| 16,283 | 7/1919 | Great Britain. |
| 1,236,001 | 6/1960 | France. |

CHARLIE T. MOON, *Primary Examiner.*

U.S. Cl. X.R.

53—42; 215—40; 264—249, 342